United States Patent
Gulati et al.

(10) Patent No.: US 11,115,959 B2
(45) Date of Patent: Sep. 7, 2021

(54) RESOURCE EXCLUSION FOR DEVICE TO DEVICE COMMUNICATION

(71) Applicant: QUALCOMM Incorporated, San Diego, CA (US)

(72) Inventors: Kapil Gulati, Hillsborough, NJ (US); Tien Viet Nguyen, Bridgewater, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/678,975

(22) Filed: Nov. 8, 2019

(65) Prior Publication Data
US 2020/0162979 A1    May 21, 2020

Related U.S. Application Data

(60) Provisional application No. 62/769,860, filed on Nov. 20, 2018.

(51) Int. Cl.
| | |
|---|---|
| *H04W 72/02* | (2009.01) |
| *H04L 5/00* | (2006.01) |
| *H04L 1/00* | (2006.01) |
| *H04W 72/04* | (2009.01) |
| *H04W 74/08* | (2009.01) |
| *H04W 36/06* | (2009.01) |
| *H04W 92/18* | (2009.01) |

(52) U.S. Cl.
CPC .......... *H04W 72/02* (2013.01); *H04L 1/0003* (2013.01); *H04L 5/0094* (2013.01); *H04W 72/0446* (2013.01); *H04W 36/06* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2017/0230915 A1* | 8/2017 | Kim | H04W 72/12 |
| 2018/0279259 A1 | 9/2018 | Gulati et al. | |
| 2019/0191461 A1* | 6/2019 | Lee | H04W 76/28 |
| 2020/0029245 A1* | 1/2020 | Khoryaev | H04W 28/08 |

FOREIGN PATENT DOCUMENTS

WO    2018145067 A1    8/2018

OTHER PUBLICATIONS

International Search Report and Written Opinion—PCT/US2019/060726—ISA/EPO—dated Mar. 19, 2020.

\* cited by examiner

*Primary Examiner* — Ayaz R Sheikh
*Assistant Examiner* — Sori A Aga
(74) *Attorney, Agent, or Firm* — Harrity & Harrity, LLP/Qualcomm Incorporated

(57) ABSTRACT

Various aspects of the present disclosure generally relate to wireless communication. In some aspects, a user equipment (UE) may select, in a first time slot, a set of resources to use for transmission to another UE; evaluate, in a second time slot, whether one or more resources of the set of resources is available; and transmit, based on the one or more resources of the set of resources being available, information to the other UE in a third time slot and using the set of resources, or reselect, based on the one or more resources of the set of resources being unavailable, another resource for transmission of the information to the other UE. Numerous other aspects are provided.

68 Claims, 6 Drawing Sheets

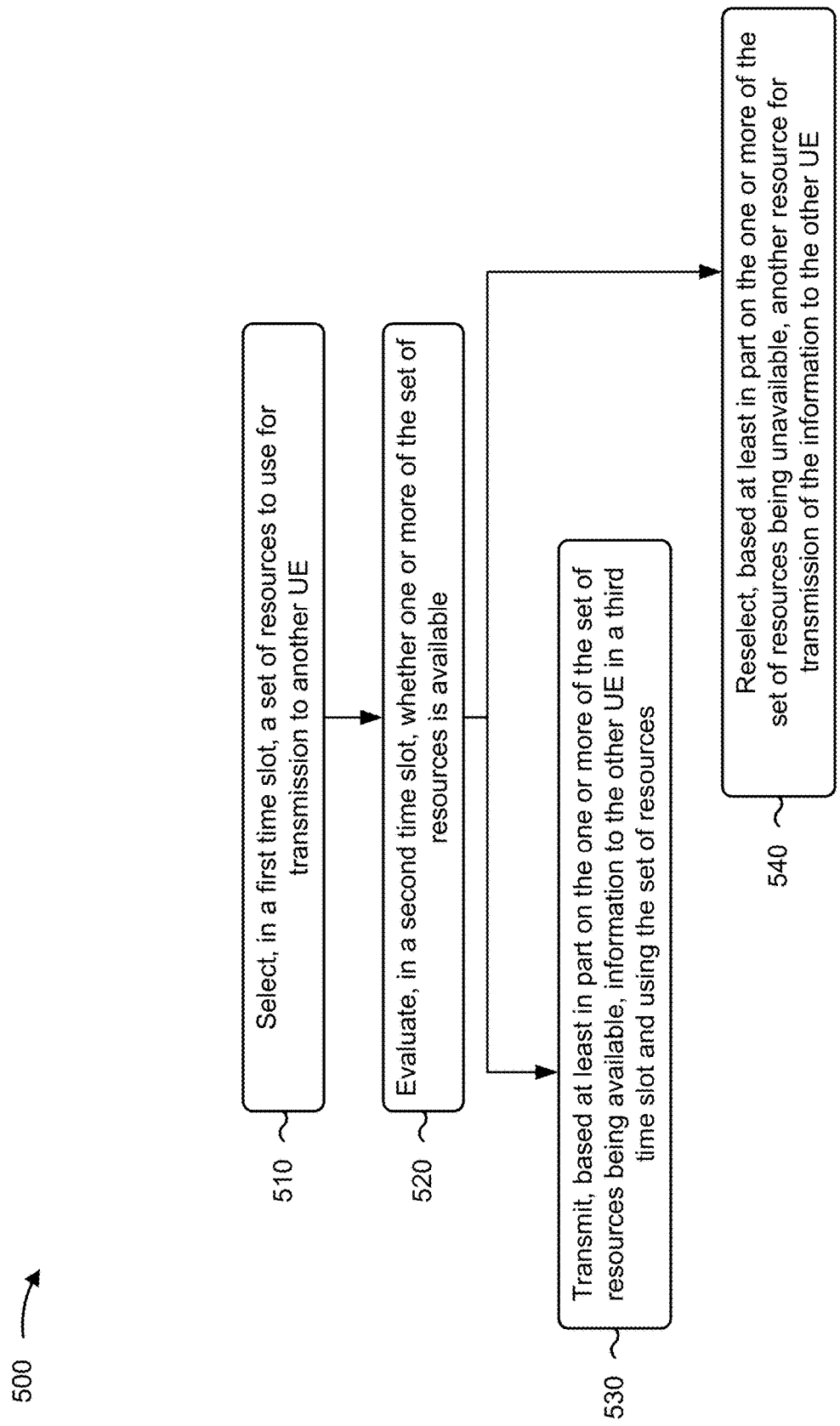

RESOURCE EXCLUSION FOR DEVICE TO DEVICE COMMUNICATION

CROSS-REFERENCE TO RELATED APPLICATION

This application claims priority to U.S. Provisional Patent Application No. 62/769,860, filed on Nov. 20, 2018, entitled "RESOURCE EXCLUSION FOR DEVICE TO DEVICE COMMUNICATION," which is hereby expressly incorporated by reference herein.

INTRODUCTION

Aspects of the present disclosure generally relate to wireless communication, and more particularly to techniques and apparatuses for device to device communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining, in a first time slot, whether a selected subset of candidate resources is still available for transmission to another UE in a second time slot that is after the first time slot. The method may include selectively transmitting information to the other UE in the second time slot based at least in part on whether the selected subset of candidate resources is still available.

In some aspects, a UE for wireless communication may include memory and one or more processors coupled to the memory. The memory and the one or more processors may be configured to determine, in a first time slot, whether a selected subset of candidate resources is still available for transmission to another UE in a second time slot that is after the first time slot. The memory and the one or more processors may be configured to selectively transmit information to the other UE in the second time slot based at least in part on whether the selected subset of candidate resources is still available.

In some aspects, a non-transitory computer-readable medium may store one or more instructions for wireless communication. The one or more instructions, when executed by one or more processors of a UE, may cause the one or more processors to determine, in a first time slot, whether a selected subset of candidate resources is still available for transmission to another UE in a second time slot that is after the first time slot. The one or more instructions, when executed by the one or more processors of the UE, may cause the one or more processors to selectively transmit information to the other UE in the second time slot based at least in part on whether the selected subset of candidate resources is still available.

In some aspects, an apparatus for wireless communication may include means for determining, in a first time slot, whether a selected subset of candidate resources is still available for transmission to another UE in a second time slot that is after the first time slot. The apparatus may include means for selectively transmitting information to the other UE in the second time slot based at least in part on whether the selected subset of candidate resources is still available.

In some aspects, a method of wireless communication, performed by a UE, may include selecting, in a first time slot, a set of resources to use for transmission to another UE. The method may include evaluating, in a second time slot, whether one or more resources of the set of resources is available. The method may include transmitting, based on the one or more resources of the set of resources being available, information to the other UE in a third time slot and using the set of resources, or reselecting, based on the one or more resources of the set of resources being unavailable, another resource for transmission of the information to the other UE.

In some aspects, a UE for wireless communication may include memory and one or more processors coupled to the memory. The memory and the one or more processors may be configured to select, in a first time slot, a set of resources to use for transmission to another UE. The memory and the one or more processors may be configured to evaluate, in a second time slot, whether one or more resources of the set of resources is available. The memory and the one or more processors may be configured to transmit, based on the one or more resources of the set of resources being available, information to the other UE in a third time slot and using the set of resources, or reselect, based on the one or more resources of the set of resources being unavailable, another resource for transmission of the information to the other UE.

In some aspects, a non-transitory computer-readable medium may store one or more instructions for wireless communication. The one or more instructions, when executed by one or more processors of a UE, may cause the one or more processors to select, in a first time slot, a set of resources to use for transmission to another UE, evaluate, in a second time slot, whether one or more resources of the set of resources is available, and transmit, based on the one or more resources of the set of resources being available, information to the other UE in a third time slot and using the set of resources, or reselect, based on the one or more resources of the set of resources being unavailable, another resource for transmission of the information to the other UE.

In some aspects, an apparatus for wireless communication may include means for selecting, in a first time slot, a set of resources to use for transmission to another UE. The apparatus may include means for evaluating, in a second time slot, whether one or more resources of the set of resources is available. The apparatus may include means for transmitting, based on the one or more resources of the set of resources being available, information to the other UE in a third time slot and using the set of resources, or means for reselecting, based on the one or more resources of the set of resources being unavailable, another resource for transmission of the information to the other UE.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a user equipment, in accordance with various aspects of the present disclosure.

DETAILED DESCRIPTION

Figure 1:
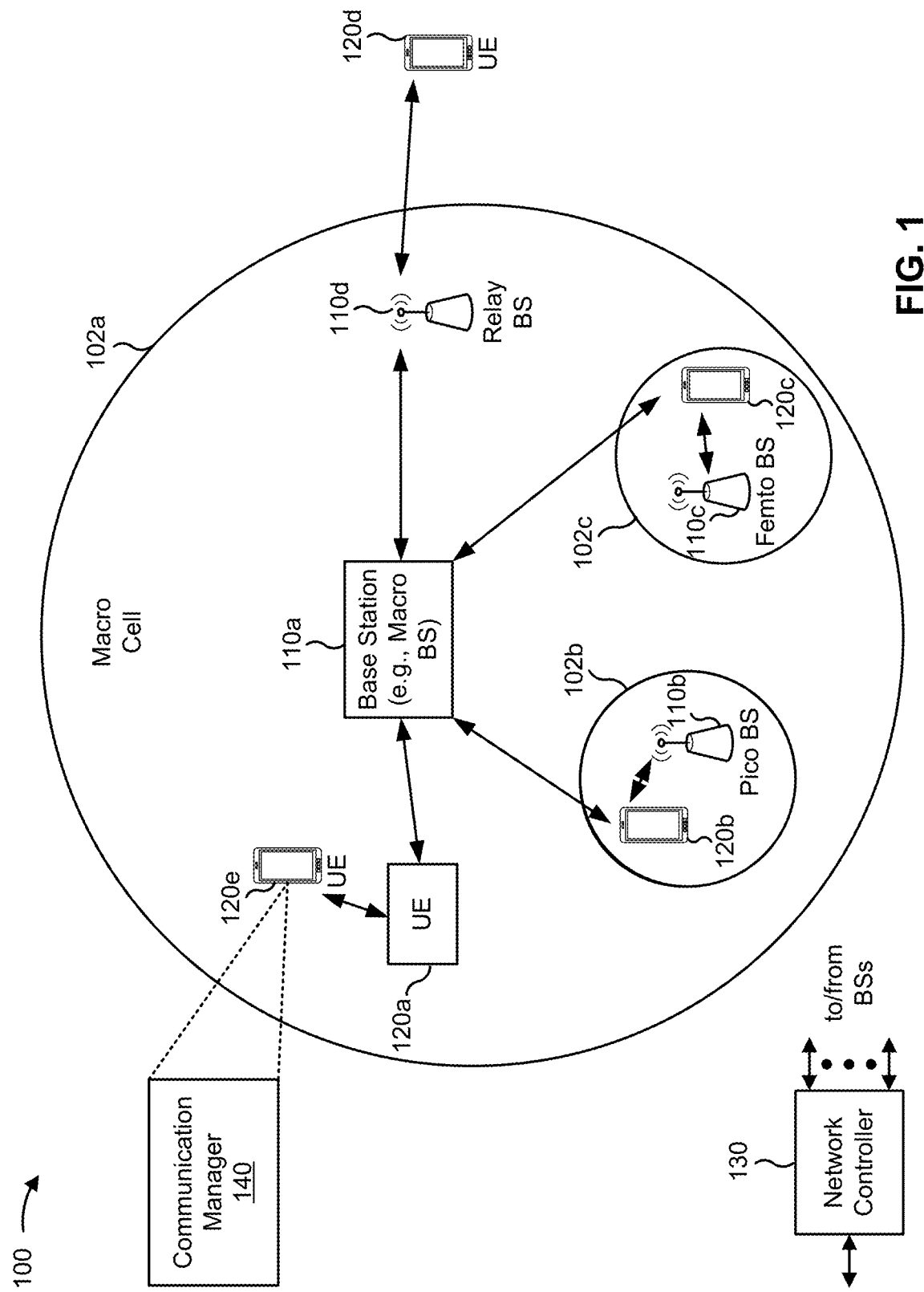
FIG. 1 is a block diagram conceptually illustrating an example of a wireless communication network, in accordance with various aspects of the present disclosure.

In some communications systems, two or more subordinate entities (e.g., UEs) may communicate with each other using sidelink signals. Real-world applications of such sidelink communications may include public safety, proximity services, UE to network relaying, vehicle to vehicle (V2V) communications, vehicle to everything (V2X) communications, Internet of Everything (IoE) communications, IoT communications, mission-critical mesh communications, peer to peer (P2P) communications, device to device (D2D) communications, and/or various other suitable applications. Generally, a sidelink signal may refer to a signal communicated from one subordinate entity to another subordinate entity without relaying that communication through a scheduling entity (e.g., a UE or a BS), even though the scheduling entity may be utilized for scheduling and/or control purposes. Although some aspects described herein are described in terms of a UE being a subordinate entity, other configurations are contemplated, such as a BS being a subordinate entity. In some cases, sidelink communications may occur in unlicensed spectrum, which may use spectrum sharing.

In some communications systems, spectrum sharing may be used to share spectrum between different operators, cells, UEs, and/or the like. Some operators may use a contention-based approach to share spectrum. For example, a first UE that wishes to communicate with a second UE in shared spectrum may perform a contention-based approach, such as a listen-before-talk (LBT) procedure, a random resource selection procedure, a request response based resource selection procedure, and/or the like. In this way, the first UE may reserve resources for communication and avoid interference associated with transmissions from a third UE.

In such a contention-based approach, the first UE may exclude, from a set of available resources for transmission to the second UE, one or more resources that are being utilized by other UEs in proximity to the first UE. For example, a third UE may transmit control information indicating that the third UE is to transmit from a first slot n−2 to a third slot n using a particular subchannel. The first UE may determine which resources to exclude based at least in part on the control information identifying used resources, based at least in part on a reference signal received power of the control information indicating a likelihood of interference, or based at least in part on location information in the control transmission indicating a likelihood of interference, and/or the like. In this case, the first UE may determine to avoid selecting resources from the particular subchannel from the first slot to the third slot when attempting to transmit to the second UE.

However, determining which resources to exclude from use for transmission, selecting resources for transmission, and preparing to transmit using selected resources may take an excessive amount of time by a UE. Moreover, control information identifying which resources to exclude may not be received until a slot that immediately precedes a slot in which the UE wishes to transmit, which may not provide enough time for UEs with limited processing capabilities to perform procedures associated with preparing for transmission. For example, after receiving the control information, a UE may need to decode the control information of a physical sidelink control channel (PSCCH). Additionally, or alternatively, the UE may need to determine which resources to exclude and select resources to use. Additionally, or alternatively, the UE may need to encode the information for transmission using selected resources, perform physical channel generation for encoded information (e.g., scrambling, modulation, and/or the like), perform resource element mapping for the physical channel, and generate an orthogonal frequency division multiplexing (OFDM) signal based at least in part on the resource element mapping. Additionally, or alternatively, the UE may need to prepare an antenna to transmit the OFDM signal.

Some aspects described herein may perform an advance resource selection and transmission preparation to enable a UE to satisfy a processing timeline constraint. For example, a UE may determine, in a first slot, whether a selected subset of candidate resources is still available for transmission in a second slot that follows the first slot. In this case, the UE may have selected the subset of candidate resources and proactively prepared for transmission in a zero$^{th}$ slot occurring before the first slot. Further, the UE may selectively transmit information using the selected subset of candidate resources based at least in part on determining whether the selected subset of candidate resources is still available. For example, in the zero$^{th}$ slot, the UE may generate an OFDM signal for transmitting information in the second slot, in the first slot the UE may determine whether to transmit the OFDM signal in the second slot, and in the second slot the UE may transmit the OFDM signal. In this way, by pre-generating the OFDM signal for transmission using pre-selected resources, rather than generating the OFDM signal on-demand when resources are determined to be available, the UE enables satisfaction of processing timeline constraints.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, and/or the like. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. The BS may perform some scheduling and/or control in the network, such as by indicating to UEs a resource grid that the UEs are to use. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller may also provide information identifying a resource grid that UEs may use, such as information identifying a location of subchannels, a timing of slots, and/or the like. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., a remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120e may include a communication manager 140, and may be in communication (e.g., sidelink communication or another type of device to device communication) with the UE 120a. As described in more detail elsewhere herein, the communication manager 140 may determine, in a first time slot, whether a selected subset of candidate resources is still available for transmission to another UE in a second time slot that is after the first time slot. Additionally, or alternatively, the communication manager 140 may selectively transmit information to the other UE in the second time slot based at least in part on whether the selected subset of candidate resources is still available. Additionally, or alternatively, the communication manager 140 may perform one or more other operations described herein.

As indicated above, FIG. 1 is provided merely as an example. Other examples may differ from what is described with regard to FIG. 1.

Figure 2:
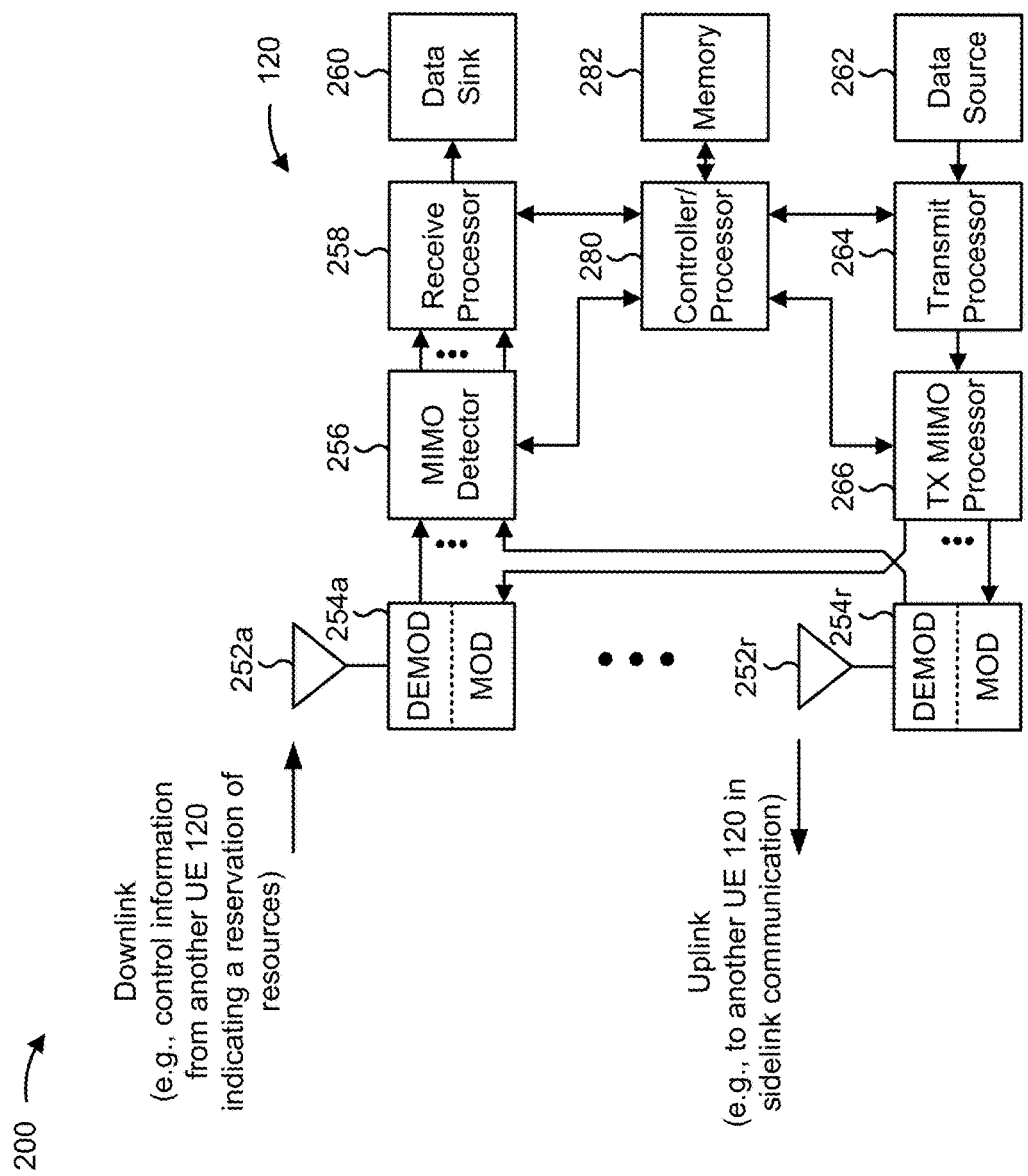
FIG. 2 is a block diagram conceptually illustrating an example of a user equipment, in accordance with various aspects of the present disclosure.

FIG. 2 shows a block diagram of a design 200 of UE 120, which may be one of the UEs in FIG. 1. UE 120 may be equipped with R antennas 252a through 252r, where in general R≥1.

At UE 120, antennas 252a through 252r may receive the downlink signals from, for example, another UE 120, a base station 110 and/or other base stations and may provide received signals to demodulators (DEMODs) 254a through 254r, respectively. The downlink signals may include control information indicating a reservation of resources, as described in more detail below. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. For example, UE 120 may receive and process data in advance of a transmission opportunity to prepare to transmit to another UE 120 at the transmission opportunity, as described below. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110.

Controller/processor 280 of UE 120 and/or any other component(s) of FIG. 2 may perform one or more techniques associated with resource exclusion for device to device communication, such as sidelink communication, as described in more detail elsewhere herein. For example, controller/processor 280 of UE 120 and/or any other component(s) of FIG. 2 may perform or direct operations of, for example, process 400 of FIG. 4, process 500 of FIG. 5, and/or other processes as described herein. Memory 282 may store data and program codes for UE 120.

In some aspects, the UE 120 may include means for determining, in a first time slot, whether a selected subset of candidate resources is still available for transmission to another UE in a second time slot that is after the first time slot, means for selectively transmitting information to the other UE in the second time slot based at least in part on whether the selected subset of candidate resources is still available, and/or the like. In some aspects, the UE 120 may include means for selecting, in a first time slot, a set of resources to use for transmission to another UE, means for evaluating, in a second time slot, whether the set of resources is available, means for transmitting, based on the set of resources being available, information to the other UE in a third time slot and using the set of resources, means for reselecting, based on the set of resources being unavailable, another resource for transmission of the information to the other UE, and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

As indicated above, FIG. 2 is provided merely as an example. Other examples may differ from what is described with regard to FIG. 2.

Figure 3A:
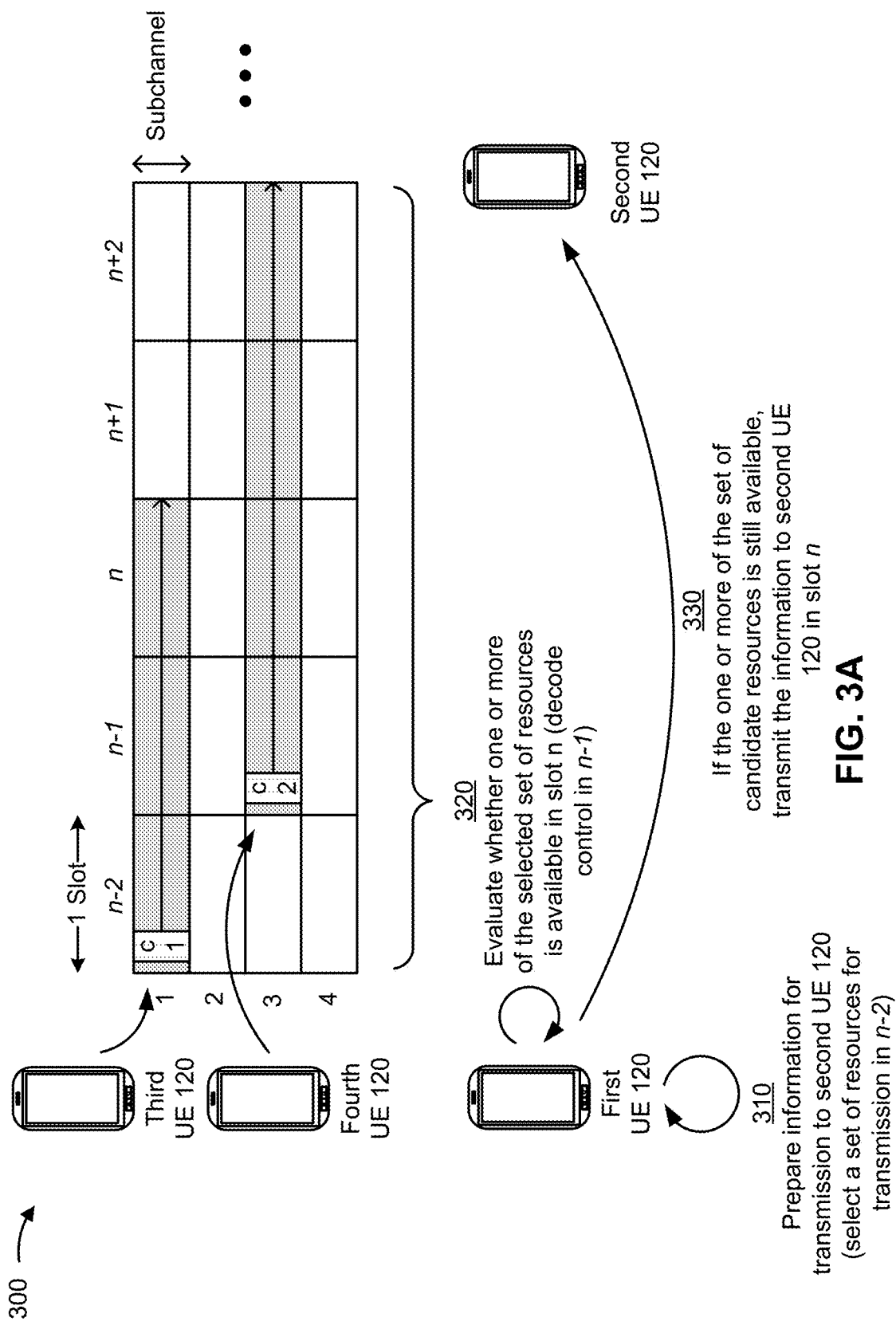
FIGS. 3A and 3B are diagrams illustrating an example of resource exclusion for device to device communication, in accordance with various aspects of the present disclosure.
Figure 3B:
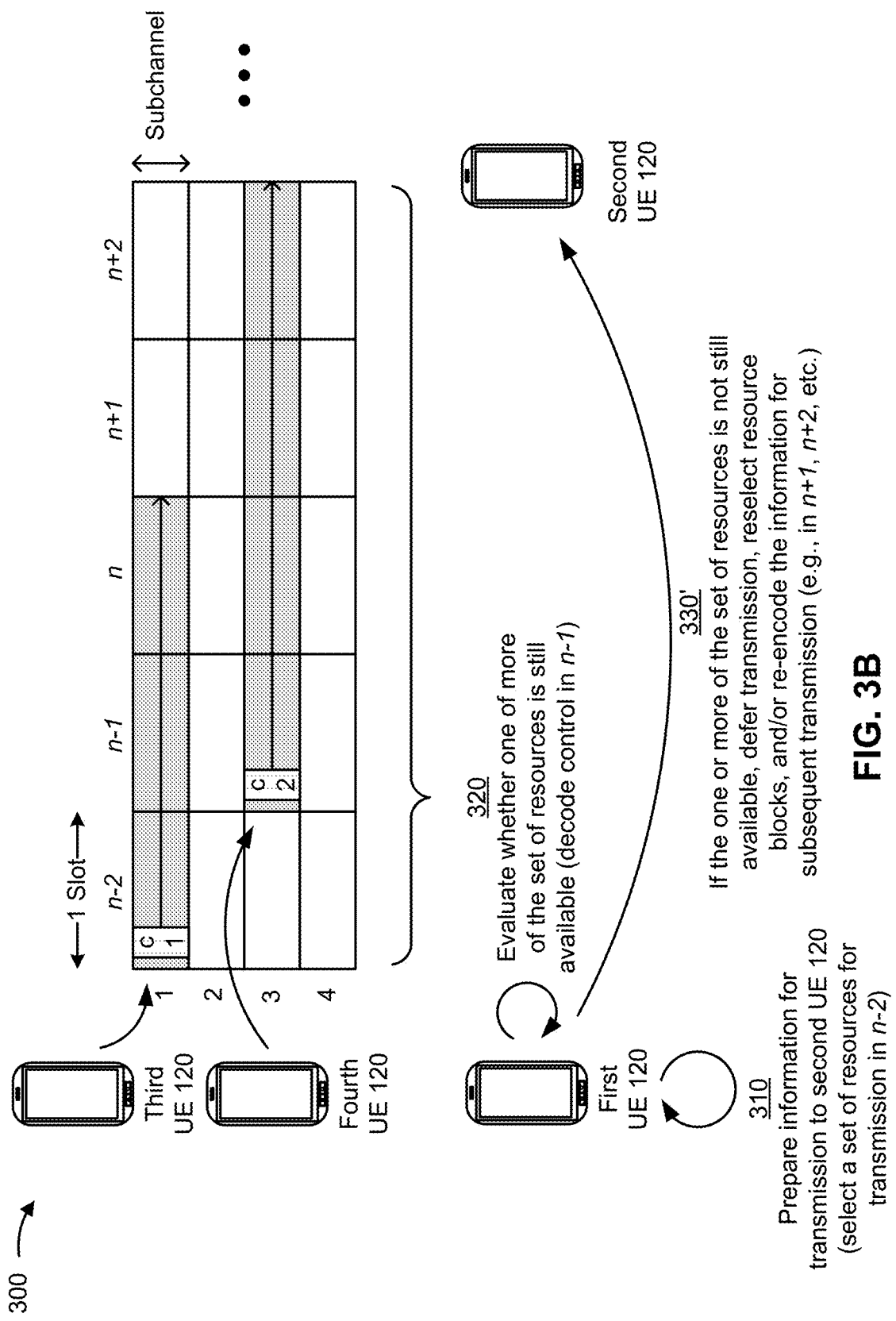

FIGS. 3A and 3B are diagrams illustrating an example 300 of resource exclusion for device to device communication, in accordance with various aspects of the present disclosure. As shown in FIG. 3A, example 300 may include a set of UEs 120 (e.g., a first UE 120, a second UE 120, a third UE 120, and a fourth UE 120).

As further shown in FIG. 3A, first UE 120 may determine to transmit information to second UE 120 at a particular slot n (e.g., in a second subchannel). Further, third UE 120 may transmit using a first subchannel in a first set of slots (e.g., slots n−2 to n). In this case, third UE 120 may transmit control information c1 in slot n−2 to indicate that third UE 120 is to transmit until slot n. Similarly, fourth UE 120 may transmit using a third subchannel in a second set of slots (e.g., slots n−1 to n+2). In this case, fourth UE 120 may transmit control information c2 in slot n−1 to indicate that fourth UE 120 is to transmit until slot n+2.

As shown in FIG. 3A, and by reference number 310, first UE 120 may prepare information for transmission to second UE 120. For example, during slot n−2, UE 120 may select a set of resources (e.g., one or more resources) for transmission of information to second UE 120. In some aspects, UE 120 may select the set of resources based at least in part on excluding other resources. For example, based at least in part on control information c1, UE 120 may exclude resources of slots n−2 to n in the first sub channel. In some aspects, first UE 120 may proactively perform one or more processing steps associated with preparing the information for transmission using the set of resources. For example, first UE 120 may generate an OFDM signal before the set of resources occurs and before evaluating whether the set of resources will be available for transmission. In this way, first UE 120 ensures that first UE 120 is ready to transmit the information using the set of resources if the set of resources is evaluated to be available.

In some aspects, first UE 120 may identify a quantity of resources to select as the set of resources. For example, based at least in part on a size of the information, first UE 120 may select a quantity of time resources and/or frequency resources (e.g., a quantity of resource blocks, a quantity of slots, a quantity of subchannels, and/or the like) to use to transmit the information. In this case, first UE 120 may select a next available time slot (e.g., slot n) in which UE 120 may be able to transmit the information based at least in part on the next available time slot not already being reserved for another transmission (e.g., by third UE 120 or fourth UE 120). In some aspects, first UE 120 may generate one or more modulated symbols. For example, first UE 120 may generate the one or more modulated symbols for transmission in the next available resources.

In some aspects, first UE 120 may evaluate when to select the set of resources and proactively prepare for transmission based at least in part on a timeline. For example, first UE 120 may evaluate a first timeline representing a time from reception of control information (e.g., c1 or c2) to prepare to transmit the information. In this case, the first timeline may represent a processing time to process the control information to evaluate whether the set of available resources is still available. Additionally, or alternatively, first UE 120 may evaluate a second timeline representing a processing time to evaluate available resources, select a set of available resources, map at least one generated modulated symbol to the set of available resources, generate a transmit waveform for the at least one modulated symbol, and ready an antenna for transmission. Additionally, or alternatively, first UE 120 may evaluate a third timeline representing a processing time to evaluate available resources, select a set of available resources, re-encode the information and generate a physical channel, map at least one generated modulated symbol of the information to the set of available resources, generate a transmit waveform for the at least one modulated symbol, and ready an antenna for transmission.

In some aspects, first UE 120 may evaluate at least one of the timelines (e.g., the first timeline, the second timeline, the third timeline, and/or the like) based at least in part on a UE capability of first UE 120 (e.g., a processing capability). In some aspects, first UE 120 may evaluate at least one of the timelines as a particular quantity of slots, a particular quantity of symbols, an amount of time, and/or the like. In some aspects, first UE 120 may evaluate at least one of the timelines based at least in part on a subcarrier spacing. In some aspects, first UE 120 may evaluate when to select the set of available resources based at least in part on at least one of the timelines. For example, first UE 120 may select the set of available resources in slot n−2 based at least in part on an evaluation that first UE 120 may satisfy the second timeline in two slots. Similarly, first UE 120 may select slot n for a start of a transmission of the information based at least in part on evaluating that first UE 120 may satisfy the first timeline in one slot (e.g., from receiving control information c2).

As shown in FIG. 3A, and by reference number 320, first UE 120 may evaluate whether one or more of the set of resources is available for transmission. In this case, resources may be referred to as available when the resources are unoccupied by another UE 120 for transmission, and may be referred to as unavailable when the resources are reserved or occupied by another UE 120 for transmission. For example, in slot n−1, first UE 120 may decode control information c2, and may evaluate whether enough of the set of resources is available to transmit information for which the set of resources was reserved. For example, if first UE 120 selected slots n to n+2 of the second subchannel for transmission, first UE 120 may evaluate that the set of resources is available (e.g., the whole set, a subset of the set, a single resource, and/or the like). In contrast, based at least in part on control information c2, if first UE 120 selected slots n to n+2 of the third subchannel, first UE 120 may evaluate that the set of resources is not available. In this case, first UE 120 may trigger regeneration of an OFDM signal and may attempt transmission at slot n+1, which may occur if first UE 120 evaluates, in slot n, that resources of slot n+1 (e.g., of the second subchannel) are available for transmission.

In some aspects, first UE 120 may evaluate whether the set of resources is available in slot n−1 based at least in part on evaluating that first UE 120 may satisfy the first timeline, described above, in a single slot.

As shown in FIG. 3A, and by reference number 330, first UE 120 may transmit information to second UE 120 in slot n. For example, based at least in part on the set of resources being available, first UE 120 may transmit to second UE 120 in slots n to n+2 (e.g., in the second sub-channel or the fourth sub-channel). In this way, first UE 120 transmits the information to second UE 120 in slot n based at least in part on proactively preparing the information for transmission (e.g., in slot n−2), thereby enabling device-to-device transmission in unlicensed spectrum. Moreover, based at least in part on proactively preparing the information for transmission, first UE 120 is able to transmit in slot n even with less than a threshold amount of processing resources, thereby enabling satisfaction of one or more timing requirements associated with transmission in unlicensed spectrum.

As shown in FIG. 3B, and by reference number 330', first UE 120 may refrain from transmitting information to second UE 120. For example, based at least in part on the set of resources not still being available, first UE 120 may not transmit the information to second UE 120 in slot n. In some aspects, first UE 120 may evaluate to defer transmission of the information. For example, first UE 120 may evaluate to re-attempt transmission of the information in a subsequent slot that is at least a threshold time after slot n. In this case, the threshold time may be defined as a time less than the second timeline described above. For example, first UE 120 may determine an amount of processing time that is to be used to reselect different resource blocks and may wait for the subsequent slot to transmit using the current resource blocks.

In some aspects, first UE 120 may reselect resource blocks based at least in part on the set of resources not still being available. For example, first UE 120 may determine that the amount of processing time (e.g., the second timeline) to reselect different resource blocks is shorter than an amount of time to wait for a subsequent slot to transmit using current resource blocks. In this case, first UE 120 may reselect the different resource blocks, and may transmit the information using the different resource blocks. In some aspects, first UE 120 may reselect resource blocks based at least in part on an availability of an alternate set of resources of a same size as the set of available resources. In some aspects, first UE 120 may alter a modulation and coding scheme and reencode the information for transmission. For example, when alternate available resources are not occurring until after a threshold period of time, first UE 120 may select a higher modulation and coding scheme, and may reencode the information using the higher modulation and coding scheme. In some aspects, first UE 120 may reencode based at least in part on a link budget requirement of first UE 120.

In some aspects, first UE 120 may reencode the information and reselect resources blocks for transmitting the information (e.g., based at least in part on the third timeline). For example, when available resources occur at a time satisfying the third timeline, first UE 120 may reencode the information and reselect the resource blocks. In some aspects, first UE 120 may reencode the information and reselect the resource blocks based at least in part on a quality of service requirement (e.g., whether a modulation and coding scheme and a quantity of slots for the reselected resource blocks satisfy a link budget requirement). In this case, based at least in part on deferring transmission, reselecting resource blocks, reencoding the information, a combination thereof, and/or the like, first UE 120 may attempt to transmit the information in a slot after slot n. In some aspects, first UE 120 may initiate deferring the transmission, reselecting resource blocks, reencoding the information, a combination thereof, and/or the like in slot n−1 (e.g., based at least in part on evaluating that the set of resources is not available). In this way, first UE 120 proactively initiates further attempts to transmit the information, thereby reducing a delay relative to waiting to slot n to initiate another transmission attempt.

As indicated above, FIGS. 3A and 3B are provided as examples. Other examples may differ from what is described with respect to FIGS. 3A and 3B.

Figure 4:
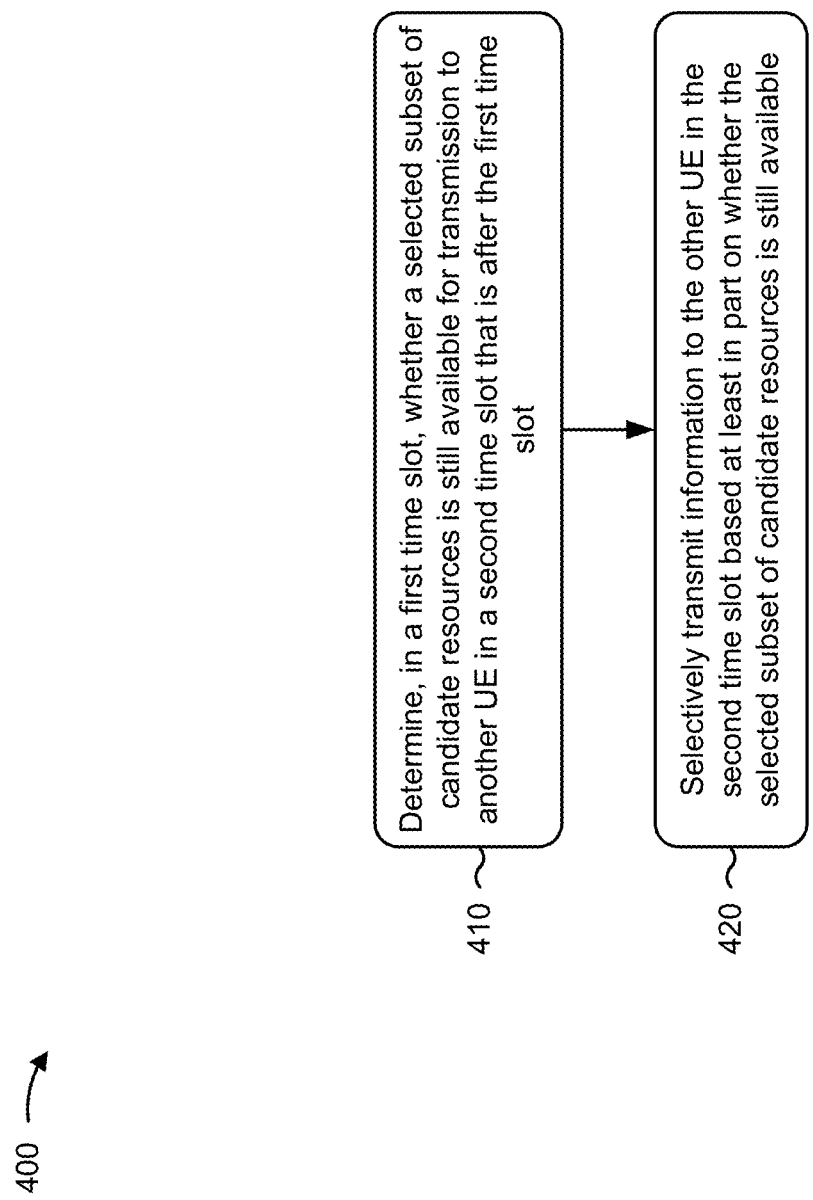
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120) performs resource exclusion for device to device communication.

As shown in FIG. 4, in some aspects, process 400 may include determining, in a first time slot, whether a selected subset of candidate resources is still available for transmission to another UE in a second time slot that is after the first time slot (block 410). For example, the UE (e.g., using controller/processor 280 and/or the like) may determine, in a first time slot, whether a selected subset of candidate resources is still available for transmission to another UE in a second time slot that is after the first time slot, as described above.

As shown in FIG. 4, in some aspects, process 400 may include selectively transmitting information to the other UE in the second time slot based at least in part on whether the selected subset of candidate resources is still available (block 420). For example, the UE (e.g., using controller/processor 280, transmit processor 264, TX MIMO processor 266, MOD 254, antenna 252, and/or the like) may selectively transmit information to the other UE in the second time slot based at least in part on whether the selected subset of candidate resources is still available, as described above.

Process 400 may include additional aspects, such as any single aspect or any combination of aspects described below and/or in connection with one or more other processes described elsewhere herein.

In some aspects, the UE is configured to determine at least one processing timeline for preparing to transmit the information based at least in part on a UE capability of the UE. In some aspects, a processing timeline, of the at least one processing timeline, is defined for at least determining whether the selected subset of candidate resources is still available and as a processing time needed from reception of control information to determine resources that are occupied or available for utilization.

In some aspects, a processing timeline, of the at least one processing timeline, is defined for at least mapping at least one symbol to at least one alternate resource block and as a processing time from reception of control information to determine at least one available resource for utilization, select a subset of the at least one available resource for utilization, map at least one generated modulated symbol to the subset of the at least one available resource for utilization, generate a waveform for the at least one modulated symbol, and ready an antenna to transmit the waveform. In some aspects, a processing timeline, of the at least one processing timeline, is defined for at least a processing time for reencoding and modulating at least one resource block and as a processing time from reception of control information to determine at least one available resource for utilization, re-encode the information and generate a physical channel, map at least one generated modulated symbol to at least one selected resource, generate a waveform for the at least one modulated symbol, and ready an antenna to transmit the waveform.

In some aspects, the at least one processing timeline is defined by at least one of: a quantity of slots, a quantity of symbols, or an amount of time. In some aspects, the at least one processing timeline is based at least in part on a subcarrier spacing. In some aspects, the selected subset of candidate resources is still available and the UE is to transmit the information to the other UE in the second time slot.

In some aspects, a waveform is generated, before the first time slot, for transmitting the information to the other UE in the second time slot. In some aspects, the selected subset of candidate resources is not still available and the UE is not to transmit the information to the other UE in the second time slot. In some aspects, a difference between the second time slot and the first time slot is equal to or greater than a processing time for determining whether the selected subset of candidate resources is still available.

In some aspects, the UE is configured to re-attempt to transmit the information to the other UE in a third slot after the second time slot based at least in part on not transmitting the information to the other UE in the second time slot. In some aspects, the UE is configured to re-attempt to transmit the information based at least in part on the selected subset of candidate resources being available for transmission in the third slot. In some aspects, the UE is configured to re-attempt to transmit the information in the third slot based at least in part on a processing time for mapping at least one symbol to at least one alternate resource block and an expected delay for current resource blocks to become available.

In some aspects, the UE is configured to reselect at least one resource block for transmission in a third slot based at least in part on not transmitting the information to the other UE in the second time slot. In some aspects, the UE is configured to reselect the at least one resource block based at least in part on at least one of: an availability of an alternate subset of candidate resources, a processing time for mapping at least one symbol to at least one resource block, a processing time for reencoding and modulating at least one resource block, or a combination thereof. In some aspects, the UE is configured, based at least in part on a link budget requirement, to alter a modulation and coding scheme and reencode the information after not transmitting the information to the other UE in the second time slot.

In some aspects, the UE is configured to re-encode the information and reselect new candidate resources for transmission of the information in a third slot based at least in part on not transmitting the information to the UE in the second time slot. In some aspects, the third slot is on or after a period of time defined by a processing time for reencoding and modulating at least one resource block ahead before the first time slot. In some aspects, the UE is configured to re-encode the information and reselect the new candidate resources based at least in part on an availability, in the third slot, of an alternate subset of candidate resources of a smaller size than the selected subset of candidate resources.

In some aspects, the UE is configured to re-encode the information and reselect the new candidate resources based at least in part on a quality of service requirement. In some aspects, the UE is configured to regenerate an orthogonal frequency division multiplexing (OFDM) signal concurrent with the determining whether the selected subset of candidate resources is still available. In some aspects, the UE is configured to receive control information for a transmission opportunity at a third slot concurrent with the determining whether the selected subset of candidate resources is still available.

In some aspects, the UE is configured to determine a quantity of resources for transmission of the information and a location of the second time slot before determining whether the selected subset of candidate resources is still available. In some aspects, the UE is configured to generate modulated symbols to transmit the information before determining whether the selected subset of candidate resources is still available. In some aspects, the UE is configured to select resources as the selected subset of candidate resources before determining whether the selected subset of candidate resources is still available.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a UE, in accordance with various aspects of the present disclosure. Example process 500 is an example where the UE (e.g., UE 120 and/or the like) performs operations associated with resource exclusion for device to device communication.

As shown in FIG. 5, in some aspects, process 500 may include selecting, in a first time slot, a set of resources to use for transmission to another UE (block 510). For example, the UE (e.g., controller/processor 280 and/or the like) may select, in a first time slot, a set of resources to use for transmission to another UE, as described above.

As further shown in FIG. 5, in some aspects, process 500 may include evaluating, in a second time slot, whether one or more resources of the set of resources is available (block 520). For example, the UE (e.g., controller/processor 280 and/or the like) may evaluate, in a second time slot, whether one or more resources of the set of resources is available, as described above.

As further shown in FIG. 5, in some aspects, process 500 may include transmitting, based on the one or more resources of the set of resources being available, information to the other UE in a third time slot and using the set of resources (block 530). For example, the UE (e.g., using controller/processor 280, transmit processor 264, TX MIMO processor 266, MOD 254, antenna 252, and/or the like) may transmit, based on the one or more resources of the set of resources being available, information to the other UE in a third time slot and using the set of resources, as described above.

As further shown in FIG. 5, in some aspects, process 500 may include reselecting, based on the one or more resources of the set of resources being unavailable, another resource for transmission of the information to the other UE (block

540). For example, the UE (e.g., using antenna 252, DEMOD 254, MIMO detector 256, receive processor 258, controller/processor 280, and/or the like) may reselect, based on the one or more resources of the set of resources being unavailable, another resource for transmission of the information to the other UE, as described above.

Process 500 may include additional aspects, such as any single aspect or any combination of aspects described below and/or in connection with one or more other processes described elsewhere herein.

In a first aspect, process 500 includes indicating the selection of the set of resources based at least in part on selecting the set of resources.

In a second aspect, alone or in combination with the first aspect, the second time slot is defined with respect to the third time slot and at least one processing timeline for preparing to transmit the information.

In a third aspect, alone or in combination with one or more of the first and second aspects, a processing timeline, of the at least one processing timeline, is defined for at least determining whether the set of resources is available and as a processing time from reception of control information to determine resources that are unavailable or available for utilization.

In a fourth aspect, alone or in combination with one or more of the first through third aspects, the at least one processing timeline is defined as a quantity of slots.

In a fifth aspect, alone or in combination with one or more of the first through fourth aspects, the at least one processing timeline is based at least in part on a UE capability of the UE.

In a sixth aspect, alone or in combination with one or more of the first through fifth aspects, the at least one processing timeline is based at least in part on a subcarrier spacing.

In a seventh aspect, alone or in combination with one or more of the first through sixth aspects, a fourth time slot for reselecting another resource is defined with respect to a processing timeline, and the processing timeline is defined for at least mapping at least one symbol to at least one alternate resource block and as a processing time from reception of control information to determine at least one available resource for utilization, select a subset of the at least one available resource for utilization, map at least one generated modulated symbol to the subset of the at least one available resource for utilization, generate a waveform for the at least one generated modulated symbol, and ready an antenna to transmit the waveform.

In an eighth aspect, alone or in combination with one or more of the first through seventh aspects, a fourth time slot for reselecting another resource is defined with respect to a processing timeline, and the processing timeline is defined for at least a processing time for rate matching and modulating at least one resource block and as a processing time from reception of control information to determine at least one available resource for utilization, re-encode the information and generate a physical channel, map at least one generated modulated symbol to at least one selected resource, generate a waveform for the at least one generated modulated symbol, and ready an antenna to transmit the waveform.

In a ninth aspect, alone or in combination with one or more of the first through eighth aspects, process 500 includes generating a waveform, before the second time slot, for transmitting the information to the other UE in the third time slot.

In a tenth aspect, alone or in combination with one or more of the first through ninth aspects, a difference between the third time slot and the second time slot is equal to or greater than a processing time for determining whether the set of resources is available.

In an eleventh aspect, alone or in combination with one or more of the first through tenth aspects, process 500 includes transmitting, in a fourth time slot, the information to the other UE using the other resource.

In a twelfth aspect, alone or in combination with one or more of the first through eleventh aspects, the other resource is a part of the set of resources in the fourth time slot.

In a thirteenth aspect, alone or in combination with one or more of the first through twelfth aspects, process 500 includes transmitting the information in the fourth time slot based at least in part on a processing time for mapping at least one symbol to at least one alternate resource block and a delay for current resource blocks to become available.

In a fourteenth aspect, alone or in combination with one or more of the first through thirteenth aspects, reselecting the other resource includes reselecting the at least one alternate resource block based at least in part on at least one of: an availability of an alternate set of resources, a processing time for mapping at least one symbol to at least one resource block, a processing time for reencoding and modulating at least one resource block, or a combination thereof.

In a fifteenth aspect, alone or in combination with one or more of the first through fourteenth aspects, process 500 includes altering, based at least in part on a link budget requirement, a modulation and coding scheme; and reencoding the information after reselecting the other resource.

In a sixteenth aspect, alone or in combination with one or more of the first through fifteenth aspects, process 500 includes reselecting the other resource based at least in part on an availability of an alternate set of resources of a smaller size than the set of resources.

In a seventeenth aspect, alone or in combination with one or more of the first through sixteenth aspects, process 500 includes reselecting the other resource based at least in part on a quality of service requirement.

In an eighteenth aspect, alone or in combination with one or more of the first through seventeenth aspects, process 500 includes regenerating an orthogonal frequency division multiplexing (OFDM) signal concurrent with evaluating whether the set of resources is available.

In a nineteenth aspect, alone or in combination with one or more of the first through eighteenth aspects, process 500 includes receiving control information for a transmission opportunity at a fourth time slot concurrent with the evaluating whether the set of resources is available.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    selecting, in a first time slot, a set of resources to use for transmission to another UE;
    evaluating, in a second time slot, that one or more resources of the set of resources are unavailable, wherein the second time slot is defined based at least in part on at least one processing timeline, and wherein the at least one processing timeline is defined based at least in part on one or more of:
        a quantity of slots, or
        a subcarrier spacing; and
    reselecting another resource for transmission of information to the other UE based on the one or more resources of the set of resources being unavailable.

2. The method of claim 1, further comprising:
    determining that one or more other resources of the set of resources are available; and
    transmitting other information using the one or more other resources of the set of resources.

3. The method of claim 1, further comprising:
    indicating the selection of the set of resources based at least in part on selecting the set of resources.

4. The method of claim 1, wherein the second time slot is further defined based at least in part on a third time slot.

5. The method of claim 1, wherein a processing timeline, of the at least one processing timeline, is defined for at least one of:
    determining whether the one or more resources of the set of resources are unavailable, or
    a processing time from reception of control information to determine resources that are unavailable or available for utilization.

6. The method of claim 1, wherein the at least one processing timeline is defined based at least in part on Hall the quantity of slots.

7. The method of claim 1, wherein the at least one processing timeline is based at least in part on a UE capability of the UE.

8. The method of claim 1, wherein the at least one processing timeline is defined based at least in part on the subcarrier spacing.

9. The method of claim 1, wherein a fourth time slot for reselecting the other resource is defined by a start point and a duration,
    wherein the start point is reception of control information, and
    wherein duration is defined based at least in part on an amount of processing time to perform a set of operations,
        the set of operations including one or more of:
            mapping at least one symbol to at least one alternate resource block,
            determining at least one available resource for utilization,
            selecting a subset of the at least one available resource for utilization,
            mapping at least one generated modulated symbol to the subset of the at least one available resource for utilization,
            generating a waveform for the at least one generated modulated symbol, or
            readying an antenna to transmit the waveform.

10. The method of claim 1, wherein a fourth time slot for reselecting the other resource is defined by a start point and a duration,
    wherein the start point is reception of control information, and
    wherein the duration is defined based at least in part on an amount of processing time to perform a set of operations,
        the set of operations including one or more of:
            rate matching and modulating at least one resource block,
            determining at least one available resource for utilization,
            re-encoding the information and generating a physical channel,
            mapping at least one generated modulated symbol to at least one selected resource,
            generating a waveform for the at least one generated modulated symbol, or
            readying an antenna to transmit the waveform.

11. The method of claim 1, further comprising:
generating a waveform, before the second time slot, for transmitting other information to the other UE in a third time slot.

12. The method of claim 1, wherein a difference between a third time slot and the second time slot is equal to or greater than a processing time for determining that the one or more resources of the set of resources are unavailable.

13. The method of claim 1, further comprising:
transmitting, in a fourth time slot, the information to the other UE using the other resource.

14. The method of claim 13, wherein the other resource is included in the set of resources in the fourth time slot.

15. The method of claim 13, further comprising:
transmitting the information in the fourth time slot based at least in part on one or more of a processing time for mapping at least one symbol to at least one alternate resource block or a delay for current resource blocks to become available.

16. The method of claim 15, wherein reselecting the other resource comprises:
reselecting the at least one alternate resource block based at least in part on at least one of:
an availability of an alternate set of resources,
a processing time for mapping at least one symbol to at least one resource block,
a processing time for re-encoding and modulating at least one resource block, or
a combination thereof.

17. The method of claim 1, further comprising:
altering, based at least in part on a link budget requirement, a modulation and coding scheme; and
re-encoding the information after reselecting the other resource.

18. The method of claim 1, wherein reselecting the other resource comprises:
reselecting the other resource based on the one or more resources of the set of resources being unavailable and based at least in part on an availability of an alternate set of resources of a smaller size than the set of resources.

19. The method of claim 1, further comprising:
regenerating an orthogonal frequency division multiplexing (OFDM) signal concurrent with evaluating that the one or more resources of the set of resources are unavailable.

20. The method of claim 1, further comprising:
receiving control information for a transmission opportunity at a fourth time slot concurrent with the evaluating that the one or more resources of the set of resources are unavailable.

21. A user equipment (UE) for wireless communication, comprising:
a memory; and
one or more processors coupled to the memory, the memory and the one or more processors configured to:
select, in a first time slot, a set of resources to use for transmission to another UE;
evaluate, in a second time slot, that one or more resources of the set of resources are unavailable, wherein the second time slot is defined based at least in part on at least one processing timeline, and wherein the at least one processing timeline is defined based at least in part on one or more of:
a quantity of slots, or
a subcarrier spacing; and
reselect another resource for transmission of information to the other UE based on the one or more resources of the set of resources being unavailable.

22. The UE of claim 21, wherein the memory and the one or more processors are further configured to:
indicate the selection of the set of resources based at least in part on selecting the set of resources.

23. The UE of claim 21, wherein the second time slot is further defined based at least in part on a third time slot.

24. A non-transitory computer-readable medium storing one or more instructions for wireless communication, the one or more instructions comprising:
one or more instructions that, when executed by one or more processors of a user equipment (UE), cause the one or more processors to:
select, in a first time slot, a set of resources to use for transmission to another UE;
evaluate, in a second time slot, that one or more resources of the set of resources are unavailable, wherein the second time slot is defined based at least in part on at least one processing timeline, and wherein the at least one processing timeline is defined based at least in part on one or more of:
a quantity of slots, or
a subcarrier spacing; and
reselect another resource for transmission of information to the other UE based on the one or more resources of the set of resources being unavailable.

25. The non-transitory computer-readable medium of claim 24, wherein the one or more instructions, when executed by the one or more processors, further cause the one or more processors to:
indicate the selection of the set of resources based at least in part on selecting the set of resources.

26. The non-transitory computer-readable medium of claim 24, wherein the second time slot is further defined based at least in part on a the third time slot.

27. The non-transitory computer-readable medium of claim 26, wherein a processing timeline, of the at least one processing timeline, is defined for at least one of:
determining whether the one or more resources of the set of resources are unavailable, or
a processing time from reception of control information to determine resources that are unavailable or available for utilization.

28. An apparatus for wireless communication, comprising:
means for selecting, in a first time slot, a set of resources to use for transmission to another UE;
means for evaluating, in a second time slot, that one or more resources of the set of resources are unavailable, wherein the second time slot is defined based at least in part on at least one processing timeline, and wherein the at least one processing timeline is defined based at least in part on one or more of:
a quantity of slots, or
a subcarrier spacing; and
means for reselecting another resource for transmission of information to the other UE based on the one or more resources of the set of resources being unavailable.

29. The apparatus of claim 28, further comprising:
means for indicating the selection of the set of resources based at least in part on selecting the set of resources.

30. The apparatus of claim 28, wherein the second time slot is further defined based at least in part on a the third time slot.

31. The method of claim 1, wherein the other resource is reselected further based on a quality of service requirement.

32. The method of claim 1, further comprising:
transmitting the information to the other UE using the other resource.

33. The UE of claim 21, wherein the memory and the one or more processors are further configured to:
transmit the information to the other UE using the other resource.

34. The UE of claim 21, wherein the at least one processing timeline is defined based at least in part on the quantity of slots.

35. The UE of claim 21, wherein the at least one processing timeline is defined based at least in part on the subcarrier spacing.

36. The UE of claim 21, wherein the memory and the one or more processors are further configured to:
receive control information for a transmission opportunity at a fourth time slot concurrent with the evaluating that the one or more resources of the set of resources are unavailable.

37. The non-transitory computer-readable medium of claim 24, wherein the one or more instructions, when executed by the one or more processors, further cause the one or more processors to:
transmit the information to the other UE using the other resource.

38. The non-transitory computer-readable medium of claim 24, wherein the at least one processing timeline is defined based at least in part on the quantity of slots.

39. The non-transitory computer-readable medium of claim 24, wherein the at least one processing timeline is defined based at least in part on the subcarrier spacing.

40. The non-transitory computer-readable medium of claim 24, wherein the one or more instructions, when executed by the one or more processors, further cause the one or more processors to:
receive control information for a transmission opportunity at a fourth time slot concurrent with the evaluating that the one or more resources of the set of resources are unavailable.

41. The apparatus of claim 28, further comprising:
means for transmitting the information to the other UE using the other resource.

42. The apparatus of claim 28, wherein the at least one processing timeline is defined based at least in part on the quantity of slots.

43. The apparatus of claim 28, wherein the at least one processing timeline is defined based at least in part on the subcarrier spacing.

44. The apparatus of claim 28, further comprising:
means for receiving control information for a transmission opportunity at a fourth time slot concurrent with the evaluating that the one or more resources of the set of resources are unavailable.

45. A method of wireless communication performed by a user equipment (UE), comprising:
selecting, in a first time slot, a set of resources to use for transmission to another UE;
evaluating, in a second time slot, that one or more resources of the set of resources are available, wherein the second time slot is defined based at least in part on at least one processing timeline, and wherein the at least one processing timeline is defined based at least in part on one or more of:
a quantity of slots, or
a subcarrier spacing; and
transmitting, based on the one or more resources of the set of resources being available, information to the other UE in a third time slot.

46. The method of claim 45, wherein the second time slot is further defined based at least in part on the third time slot.

47. The method of claim 45, wherein the at least one processing timeline is defined based at least in part on the quantity of slots.

48. The method of claim 45, wherein the at least one processing timeline is defined based at least in part on the subcarrier spacing.

49. The method of claim 45, further comprising:
receiving control information for a transmission opportunity at a fourth time slot concurrent with the evaluating that the one or more resources of the set of resources are available.

50. The method of claim 45, further comprising:
determining that one or more other resources are unavailable; and
reselecting another resource for transmission of other information based on the one or more other resources being unavailable.

51. A user equipment (UE) for wireless communication, comprising:
a memory; and
one or more processors coupled to the memory, the memory and the one or more processors configured to:
select, in a first time slot, a set of resources to use for transmission to another UE;
evaluate, in a second time slot, that one or more resources of the set of resources are available, wherein the second time slot is defined based at least in part on at least one processing timeline, and wherein the at least one processing timeline is defined based at least in part on one or more of:
a quantity of slots, or
a subcarrier spacing; and
transmit, based on the one or more resources of the set of resources being available, information to the other UE in a third time slot.

52. The UE of claim 51, wherein the second time slot is further defined based at least in part on the third time slot.

53. The UE of claim 51, wherein the at least one processing timeline is defined based at least in part on the quantity of slots.

54. The UE of claim 51, wherein the at least one processing timeline is defined based at least in part on the subcarrier spacing.

55. The UE of claim 51, wherein the memory and the one or more processors are further configured to:
receive control information for a transmission opportunity at a fourth time slot concurrent with the evaluating that the one or more resources of the set of resources are available.

56. The UE of claim 51, wherein the memory and the one or more processors are further configured to:
determine that one or more other resources are unavailable; and
reselect another resource for transmission of other information based on the one or more other resources being unavailable.

57. A non-transitory computer-readable medium storing one or more instructions for wireless communication, the one or more instructions comprising:
one or more instructions that, when executed by one or more processors of a user equipment (UE), cause the one or more processors to:

select, in a first time slot, a set of resources to use for transmission to another UE;

evaluate, in a second time slot, that one or more resources of the set of resources are available, wherein the second time slot is defined based at least in part on at least one processing timeline, and wherein the at least one processing timeline is defined based at least in part on one or more of:

a quantity of slots, or a subcarrier spacing; and transmit, based on the one or more resources of the set of resources being available, information to the other UE in a third time slot.

58. The non-transitory computer-readable medium of claim 57, wherein the second time slot is further defined based at least in part on the third time slot.

59. The non-transitory computer-readable medium of claim 57, wherein the at least one processing timeline is defined based at least in part on the quantity of slots.

60. The non-transitory computer-readable medium of claim 57, wherein the at least one processing timeline is defined based at least in part on the subcarrier spacing.

61. The non-transitory computer-readable medium of claim 57, wherein the one or more instructions, when executed by the one or more processors, further cause the one or more processors to:

receive control information for a transmission opportunity at a fourth time slot concurrent with the evaluating that the one or more resources of the set of resources are available.

62. The non-transitory computer-readable medium of claim 57, wherein the one or more instructions, when executed by the one or more processors, further cause the one or more processors to:

determine that one or more other resources are unavailable; and reselect another resource for transmission of other information based on the one or more other resources being unavailable.

63. An apparatus for wireless communication, comprising:

means for selecting, in a first time slot, a set of resources to use for transmission to another UE;

means for evaluating, in a second time slot, that one or more resources of the set of resources are available, wherein the second time slot is defined based at least in part on at least one processing timeline, and wherein the at least one processing timeline is defined based at least in part on one or more of:

a quantity of slots, or a subcarrier spacing; and means for transmitting, based on the one or more resources of the set of resources being available, information to the other UE in a third time slot.

64. The apparatus of claim 63, wherein the second time slot is further defined based at least in part on the third time slot.

65. The apparatus of claim 63, wherein the at least one processing timeline is defined based at least in part on the quantity of slots.

66. The apparatus of claim 63, wherein the at least one processing timeline is defined based at least in part on the subcarrier spacing.

67. The apparatus of claim 63, further comprising:

means for receiving control information for a transmission opportunity at a fourth time slot concurrent with the evaluating that the one or more resources of the set of resources are available.

68. The apparatus of claim 63, further comprising:

means for determining that one or more other resources are unavailable; and means for reselecting another resource for transmission of other information based on the one or more other resources being unavailable.

\* \* \* \* \*